May 21, 1968  J. R. PALMER  3,384,331

AIRCRAFT RETRACTABLE UNDERCARRIAGE

Filed Aug. 29, 1966  2 Sheets-Sheet 1

INVENTOR
JOHN R. PALMER
BY
Christian, Seabury & Matthews
ATTORNEY

May 21, 1968  J. R. PALMER  3,384,331
AIRCRAFT RETRACTABLE UNDERCARRIAGE
Filed Aug. 29, 1966  2 Sheets-Sheet 2

INVENTOR
JOHN R. PALMER
BY
Christensen, Sanborn & Matthews
ATTORNEY

United States Patent Office 3,384,331
Patented May 21, 1968

3,384,331
AIRCRAFT RETRACTABLE UNDERCARRIAGE
John Raymond Palmer, Cheltenham, England, assignor to Dowty Rotol Limited, Gloucester, England, a British company
Filed Aug. 29, 1966, Ser. No. 575,782
Claims priority, application Great Britain, Sept. 3, 1965, 37,749/65
5 Claims. (Cl. 244—102)

This invention relates to aircraft retractable undercarriages.

According to the invention a retractable undercarriage comprises a lever arranged to turn on a pivotal mounting at its upper end, a landing wheel mounted at or adjacent to the lower end of the lever, and a telescopic shock absorber acting between the lever and a pivot which is spaced from the lever pivot so that upward turning movement of the lever about its pivot is resisted by compression of the shock absorber, wherein the lower end of the shock absorber is pivotally connected to a member which is movable telescopically with respect to the lever, and a locking device is provided which is capable of holding said movable member contracted with respect to the lever in the extended condition of the undercarriage, the locking device being releasable to enable the movable member to extend with respect to the lever during upward retraction movement of the latter.

The landing wheel may be carried either by the lower end of the lever or by the movable member.

A second locking device may be provided to hold the movable member extended with respect to the lever.

The upper pivots of the lever and the shock absorber may be carried by a main member which is itself hinged to the aircraft on an axis parallel to the longitudinal direction of the aircraft, whereby the whole undercarriage assembly may be swung sideways to a retracted position in which the plane of the wheel is generally transverse.

One embodiment of the invention is shown in the accompanying drawings, of which—

Figure 1:
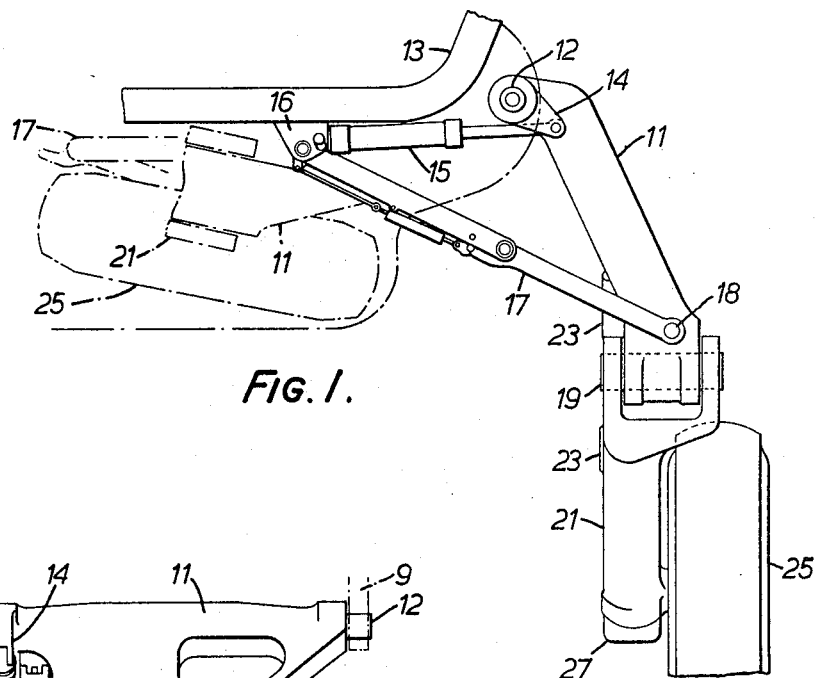
Figure 2:
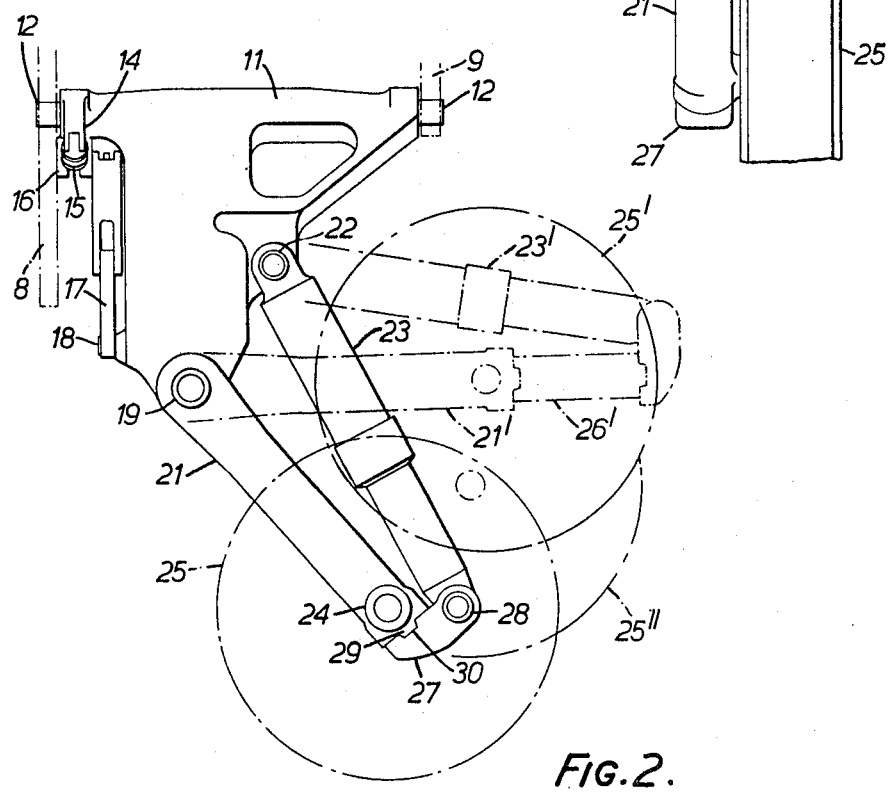
Figure 3:
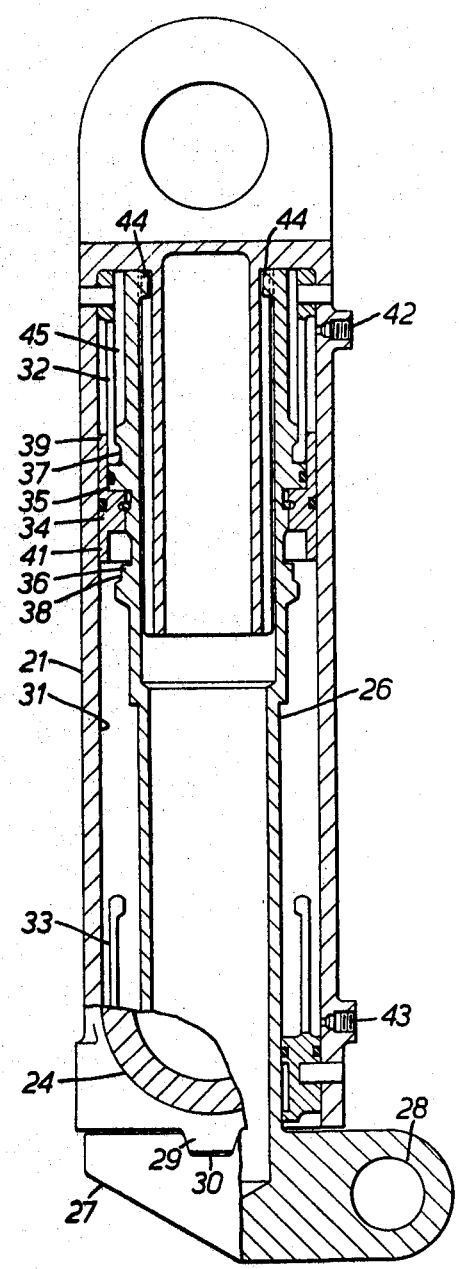

FIGURE 1 is a front elevation, and
FIGURE 2 is a side elevation of an undercarriage mounted on one side of an aircraft fuselage, and
FIGURE 3 is a partly sectional view on an enlarged scale of one member of the undercarriage.

The undercarriage is one of two mounted on opposite sides respectively of the aircraft fuselage to form the main landing gear. The mounting is provided in a pod having front and rear transverse structural members 8 and 9 respectively which are rigidly united with the structure of the fuselage proper 13.

A main member 11 is pivotally supported between the fixed members 8 and 9 by bearings 12 on an axis which is parallel to the longitudinal direction of the aircraft. The member 11 is provided with a retraction arm 14. A retraction jack 15 is interposed between the retraction arm 14 and a bracket 16 on the aircraft. A folding side stay 17 is interposed between the bracket 16 and a pivot 18 on the lower part of the main member.

The lower part of the main member 11 also carries a pivot 19 for a lever 21, and a pivot 22, FIGURE 2, for the upper end of a telescopic shock absorber. The lower end portion of the lever 21 is provided with an axle 24 for a landing wheel. The wheel is removed from FIGURE 2 to make visible the parts behind it, but its position is indicated by the chain dot line 25.

The lever 21 is of tubular form and it receives in its lower end a telescopic member 26, FIGURE 3, which is formed with a head 27 to which the lower end of the shock absorber 23 is pivoted at 28. The lever 21 and the member 26 form a hydraulic jack of the kind incorporating end position locks. The lever 21 has a bore 31 in which a crown of locking claws 32 are secured at one end while a second crown of claws 33 are secured at the other end. The telescopic member 26 carries a piston 34 which slides in the bore 31 and which has a sliding lost-motion movement on the member 26 between end stops 35 and 36. The member 26 is formed with locking grooves 37 and 38 which are engageable by the respective crowns of claws 32 or 33 in opposite end positions of the member 26. The piston 34 includes oppositely extending portions 39 and 41 which constitute locking sleeves.

In operation, fluid pressure at a connection 42 to the bore 31, firstly moves the piston 34 to the end stop 36 so that the locking sleeve 39 releases the claws 32, and thus causes the jack 21, 26 to extend. Fluid pressure at a connection 43 to the other end of the bore 31, firstly moves the piston 34 to the end stop 35 so that the locking sleeve 41 releases the claws 33, and then causes the jack 21, 26 to contract.

The jack 21, 26 with its end position locks is of known kind and needs no description in greater detail. The inner end of the telescopic member has inturned teeth 44 which engage a splined central spigot 45 within the lever 21 to prevent relative turning of the lever 21 and the member 26 during extension and contraction.

A stronger anti-turning lock is provided in the contracted condition by at least one tooth 29 and the end of the lever 21 and a socket 30 in the head 27.

In FIGURE 2, the full lines show the shock absorber 23 fully extended with the wheel 25 in the no-load position, the telescopic member 26 being locked in the contracted position. When the wheel 25 is supporting its share of the aircraft weight it moves to an intermediate position 25″ since the shock absorber 23 is loaded. The locking claws 32 are then in tension but they are held in the locking groove 37 by the locking sleeve 39.

The first stage of retraction is caused by application of fluid pressure to the connection 42 so that the telescopic member 26 extends from the lever 21. Since the shock absorber 23, being unloaded, remains at its maximum length, the lever 21 turns about its pivot 19 and the shock absorber 23 turns about its pivot 22 to the raised positions 21′ and 23′, the wheel then occupying the raised position 25′. The telescopic member 26 moves from the lever 21, during retraction, towards the circumference of the wheel 25 but not substantially beyond it, so that no enlargement of the retraction space in the pod is necessary.

For the second stage of retraction, see FIGURE 1, the jack 15 is contracted and the side stay 17 is folded to turn the assembly consisting of the main member 11, lever 21, wheel 25 and shock absorber 23, inwardly to lie in the retraction space of the pod below the fuselage proper, as shown by the chain dot line positions. In this position the plane of the wheel is generally transverse.

To lower the undercarriage, the jack 15 is extended and then the telescopic member is contracted into the lever 21 by application of fluid pressure to the connection 43.

The lever 21 and the telescopic member 26 may alternatively be constructed as a screw jack which is operated by either an electric or a hydraulic or a pneumatic motor.

In an alternative embodiment, the lever 21 and the telescopic member 26 may be provided with a contraction lock, while the first stage of retraction is accomplished by a jack which applies a turning moment either to the lever 21 or to the shock absorber 23.

In a simple embodinement of the invention, the pivots 19 and 22 may be fixed so that the wheel remains in the same plane when retracted upwardly into the aircraft.

I claim as my invention:
1. A retractable undercarriage comprising a lever pivotally mounted at one end of an axis which is transverse to the longitudinal direction of the aircraft, a landing wheel mounted near the other end of the lever, a mov- able member mounted telescopically with respect to the lever, a telescopic shock absorber which is pivotally mounted at one end on an axis parallel to the pivotal axis of the lever and which is pivotally connected at its other end to the telescopic member, the movable member being extendable from the lever during retraction movement of the lever and the shock absorber about their respective pivotal mountings and being conversely contractable towards the lever during extension movement, and a locking device operable between the lever and the telescopic member to hold the latter contracted with respect to the former in the extended condition of the undercarriage, the locking device being releasable to enable the undercarriage to be retracted.

2. A retractable undercarriage according to claim 1, wherein the lever and the movable member include a power-operated jack which is extensible to cause retraction, and retractable to cause extension, of the undercarriage.

3. A retractable undercarriage according to claim 2, wherein the power-operated jack is formed as a hydraulic jack incorporating said locking device as a mechanical lock which includes a locking sleeve, the locking sleeve being operable by fluid pressure at one end of the jack to secure the mechanical lock and being operable by fluid pressure at the other end of the jack to release the mechanical lock.

4. A retractable undercarriage according to claim 3, wherein the power-operated jack incorporates a second locking device operable by the locking sleeve to hold the movable member extended with respect to the lever.

5. A retractable undercarriage according to claim 1, wherein the pivotal mountings for the lever and the shock absorber respectively are provided on a main member which is itself hinged to the aircraft on an axis parallel to the longitudinal direction of the aircraft for movement between one position in which the plane of the wheel is generally upright and a second position in which the plane of the wheel is generally transverse.

References Cited

UNITED STATES PATENTS

| 2,868,482 | 1/1959 | Westcott | 244—102 |
| 3,127,134 | 3/1964 | Sutcliffe | 244—102 |
| 3,315,919 | 4/1967 | Perdue | 244—102 |

FOREIGN PATENTS

| 243,956 | 2/1947 | Switzerland. |

MILTON BUCHLER, *Primary Examiner.*

P. E. SAUBERER, *Assistant Examiner.*